US005602838A

United States Patent [19]
Kartalopoulos

[11] Patent Number: 5,602,838
[45] Date of Patent: Feb. 11, 1997

[54] GLOBAL MULTI-SATELLITE NETWORK

[75] Inventor: Stamatios V. Kartalopoulos, Annandale, N.J.

[73] Assignee: Lucent Technologies Inc., Murray Hill, N.J.

[21] Appl. No.: 360,518

[22] Filed: Dec. 21, 1994

[51] Int. Cl.⁶ ............................. H04B 7/185; H04J 3/24
[52] U.S. Cl. ................... 370/406; 340/826; 340/825.05; 340/825.52; 342/352; 342/367; 342/368; 370/222; 370/235; 370/319
[58] Field of Search ........................... 370/16, 16.1, 54, 370/60, 60.1, 85.12, 85.13, 85.14, 85.15, 94.1, 94.3, 104.1; 340/825.03, 826, 827, 825.05, 825.5, 825.51, 825.52; 379/269, 271, 272, 273; 455/11.1, 12.1; 342/352, 361, 367, 368, 374

[56] References Cited

U.S. PATENT DOCUMENTS

| | | | |
|---|---|---|---|
| 4,598,400 | 7/1986 | Hillis | 370/60 |
| 4,736,465 | 4/1988 | Bobey et al. | 370/94.3 |
| 4,742,511 | 5/1988 | Johnson | 370/94.3 |
| 4,797,882 | 1/1989 | Maxemchuk | 370/60 |
| 5,105,424 | 4/1992 | Flaig et al. | 370/94.1 |
| 5,175,733 | 12/1992 | Nugent | 370/54 |
| 5,289,467 | 2/1994 | Kartalopoulos | 370/85.5 |

OTHER PUBLICATIONS

William W. Wu et al., "Mobile Satellite Communications", Proceedings of the IEEE, vol. 82, No. 9 pp. 1431–1448, Sep. 1989.

N. F. Maxemchuk, "Regular Mesh Topologies in Local and Metropolitan Area Networks", AT&T Technical Journal vol. 64, No. 7, pp. 1659–1685, Sep. 1985.

S. V. Kartalopoulos, Ph.D., "Disaster Avoidance in the Manhattan Fiber Distributed Data Interface Network", Globecom '93 Proceedings, pp. 1–6(including Figure 6), Nov. 1993.

Stamatios V. Kartalopoulos, "A Manhattan Distributed Data Interface Architecture", Globecom '90 Proceedings, pp. 0141–0145, Dec. 2–5, 1990.

"Characteristics of Teledesic's Ka Bank, Low Earth Orbit, FSS Network to Provide Global Voice, Data, and Video Communications", Teledesic Corporation, Information Paper, Jun. 2, 1994.

*Primary Examiner*—Alpus H. Hsu

[57] ABSTRACT

A global satellite communication network is described. The global satellite communication network comprises a plurality of polar communication loops and a plurality of longitudinal communication loops. The polar and longitudinal communication loops are formed in three dimensional space. Each polar communication loop includes a plurality of nodes each bidirectionally communicating with adjacent communicating nodes in the polar communication loops. Each longitudinal communication loop includes a plurality of nodes each bidirectionally communicating with adjacent communicating nodes in the longitudinal communication loops. Each longitudinal communication loop is in communication with each polar communication loop via a node which is common to both the longitudinal communication loop and the polar communication loop. The common node includes a switch to transfer packets received from the polar communication loop to the longitudinal communication loop, and vice versa, as a function of destination addresses contained in the packets.

17 Claims, 12 Drawing Sheets

GLOBAL MULTI-SATELLITE NETWORK

CROSS-REFERENCE TO OTHER APPLICATIONS

The following application of common assignee contains some common disclosure, and is believed to have an effective filing date identical with that of the present application:

U.S. Patent application entitled "Bidirectional Mesh Network," by Stamatios V. Kartalopoulos, Attorney Docket No. S. V. Kartalopoulos 6 (1470.0720000), incorporated herein by reference in its entirety.

BACKGROUND OF THE INVENTION

1. Field of the Invention

The present invention relates generally to communication networks, and more particularly to global multi-satellite communication networks.

2. Related Art

Multi-satellite communication networks have been proposed to address the explosive growth (both existing and anticipated) in global multi-media and personal communication services (PCS), in both the government sector and the private sector. To be effective, a satellite network must provide continuous, error-free, and uninterrupted high-throughput transmission even if one or more satellites in the network fail. This is the case, since it is very expensive to repair a faulty satellite, due to "astronomical" accessing costs. Consequently, fault tolerance, disaster avoidance, and network survivability are important characteristics of any satellite network architecture.

Communication satellites have been in use for a number of years in both the military and private sectors. To date, a number of different satellite systems exist and more are planned.

A distinction should be made between satellite systems and satellite networks (i.e., networks of satellites). FIG. 1 illustrates an example satellite system 101. Generally, a satellite system 101 may consist of one or more satellites 104, and has a plurality of earth stations 106 (located on the surface of the earth 102). Each of these earth stations 106 "see" one or two satellites 104 in space. The satellites 104 are signal regenerators. Information is sent through a satellite system 101 as follows. A signal is uplinked from an earth station 106A. This signal is received by a satellite 104B, which downlinks the signal to another earth station 106B which is usually located thousands of miles away from earth station 106A. By placing a number of satellites 104 in space and around the globe, it becomes possible to send a signal to locations that are very remote from the originating earth station (for example, on the other side of the globe), by hopping up and down between terrestrial stations 106 and satellites 104.

Satellite systems have their advantages and disadvantages. Their disadvantages include transmission delays, echoes, multiple atmospheric signal distortions, traffic capacity limitations, fault intolerance, and potential jamming. Note that, in satellite systems, no inter-satellite communication takes place.

To increase channel (and traffic) capacity, and to overcome potential jamming, computer-based satellites in satellite systems have been deployed with sophisticated multibeam antenna technology. Multibeam antennas make it possible to have multiple fixed spot beams as well as scanning beams and at different frequencies which when under computer control, enable the satellite to autonomously set up data channels at different data rates, and via different antenna beams.

A different satellite system architecture to address traffic capacity, fault tolerance and jamming utilizes a cluster of sophisticated satellites, instead of a single satellite. As an example, LOOPUS is a satellite system with 9 satellites in highly inclined elliptical orbits planned in accordance with a Federal Republic of Germany's industry initiative. This system is planned to utilize beams operating in the frequency range of $^{14}/_{11}$ Ghz for the feeder and $^{14}/_{12}$ Ghz for mobile links where each satellite will be able to switch 2,000 32 Kbps (kilobits per second) rate channels, reconfigurable to 4,000 or 6,000 channels per region. Here also, satellites in the cluster do not communicate with each other.

A satellite network is a recently developed satellite communication architecture. FIG. 2 illustrates an example satellite network 202, where a plurality of geostationary satellites 206 are positioned in space and around the globe 204. In addition to uplink and downlink capability, each satellite 206 in the network 202 is able to communicate with each other over inter-satellite links (ISL) 210. According to this architecture, an earth station 208A uplinks a signal, which is received by a satellite 206B. The signal travels from satellite to satellite via the inter-satellite links 210 until it reaches its destination.

Three different approaches are typically discussed for implementing satellite networks. One approach involves the use of low orbiting satellites. Low orbiting satellites are easier to launch and have relatively shorter delays, but require significant terrestrial tracking, particularly inter-satellite tracking, and have relatively shorter lives. The second approach involves the use of geostationary satellites. Geostationary satellites are costlier to launch and have relatively longer delays but terrestrial and inter-satellite tracking is easier and their lives are relatively longer. The third approach, which combines many advantages of the first two approaches, employs satellites in inclined circular geo-synchronous quasi-stationary orbits, such as the "Molniya" and "Tundra" inclined elliptical orbits.

A satellite network (when compared to a satellite system and for long distance communication) introduces less transmission delays and echoes, increases traffic capacity, and is less susceptible to jamming. Consequently, it is more suitable for real-time interactive multi-media services, such as voice, interactive data, interactive video, private communication channels, and PCS, than traditional satellite systems.

Some satellite networks are already planned. A well known planned satellite network is the U.S. government's MILSTAR satellite program, that has FEP (FLTSAT EHF Package) antennas operating in the extremely high frequency (EHF) and ultra high frequency (UHF) range for Up-link/Down-link (UL/DL) and 60 Ghz cross-orbit links for satellite-to-satellite data transfer. Other planned satellite networks include DARPA's LightSat network, the U.S. Air Force's Reserve network, the U.S. Navy's SPINSAT network, and Motorola's Iridium network.

While representing an improvement over traditional satellite systems, these conventional satellite networks have a number of disadvantages. In particular, these satellite networks do not have advanced fault tolerance, disaster avoidance, and network survivability properties. Also, these conventional satellite networks do not form a complete "network in the sky," since they do not represent a global seamless wrap-around grid of inter-communicating satellites.

Thus, what is needed is a satellite network that has superior fault tolerance, disaster avoidance, and network survivability properties, and that forms a complete "network in the sky around the globe."

Before proceeding further, it may be illustrative to briefly describe a particular terrestrial communication network.

The Manhattan Street Network with Loop Architecture

The Manhattan Fiber Data Distributed Interface (also called the Manhattan Street Network (MSN) with Loop Architecture, or simply the Manhattan Network) is a network that has been considered for use with local area networks. The Manhattan Network is described in many publicly available documents, such as S. V. Kartalopoulos, "The Manhattan Fiber Data Distributed Interface Network Architecture", Proceedings of the Globecom '90 Conference, San Diego, Dec. 2–5, 1990, pp. 141–145; N. F. Maxemchuk, "Regular Mesh Topologies in Local and Metropolitan Area Networks", AT&T Bell Laboratories Technical Journal, Sep. 1985; and U.S. Pat. No. 5,289,467, all of which are herein incorporated by reference in their entireties.

FIG. 3 illustrates an example 4×4 (4 node by 4 node) Manhattan Network 302. This Manhattan Network 302 includes sixteen nodes 304, where each node 304 is individually identified by its (row, column).

The Manhattan Network 302 is a mesh network that includes a set of horizontal parallel loops 306 and a set of vertical parallel loops 308. The horizontal loops 306 intersect and connect to the vertical loops 308 at the nodes 304.

Each node 304 includes two input ports and two output ports. Each node 304 is capable of receiving data packets from any of its input ports and transmitting data packets via any of its output ports. Thus, each node 304 is capable of transporting data packets from a horizontal loop 306 to a vertical loop 308, and vice versa.

The Manhattan Network 302 has distributed control. Specifically, each node 304 in the Manhattan Network 302 makes autonomous decisions on how a packet should be routed (i.e., the routability of a packet). Hence, the Manhattan Network 302 is suitable for transporting a packet from a source node to a destination node via a number of potential different paths. Note, however, that all loops 306, 308 in the Manhattan Network 302 are unidirectional. That is, the data flow in the horizontal loops 306 is from West to East (or vise versa). The data flow in the vertical loops 308 is from North to South (or vice versa). (The North, South, East, and West directional conventions is used herein for illustrative purposes only.)

The Manhattan Network is most suitable in local area networks for high speed data transfers between two or more nodes where data deliverability is of greater importance than real-time transport. However, new broadband multi-media services demand voice and interactive video/data in addition to existing unidirectional data services. Effective voice and interactive video/data services require real-time data processing and extremely short propagation delays. Such services are called real-time communications (as opposed to store and forward communications). The Manhattan Network, because of its unidirectional characteristics, cannot always deliver a packet over the most efficient route. For example, if node (2,3) sends a packet to node (2,2), the packet must travel around the complete horizontal loop containing nodes (2,4) and (2,1) to reach node (2,2), even though nodes (2,2) and (2,3) are right next to each other.

Since the Manhattan Network cannot always deliver a packet over the most efficient route, real-time communication cannot be guaranteed when using the Manhattan Network. Consequently, the Manhattan Network cannot adequately support broadband multi-media services.

SUMMARY OF THE INVENTION

Briefly stated, the present invention is directed to a global satellite communication network comprising a plurality of polar communication loops and a plurality of longitudinal communication loops. The polar and longitudinal communication loops are formed in three dimensional space.

Each polar communication loop includes a plurality of nodes each bidirectionally communicating with adjacent communicating nodes in the polar communication loops. Each longitudinal communication loop includes a plurality of nodes each bidirectionally communicating with adjacent communicating nodes in the longitudinal communication loops.

Each longitudinal communication loop is in communication with each polar communication loop via a node which is common to both the longitudinal communication loop and the polar communication loop. The common node includes a switch to transfer packets received from the polar communication loop to the longitudinal communication loop, and vice versa, as a function of destination addresses contained in the packets.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a global multi-satellite network (GSN). The GSN exhibits superior fault tolerance, disaster avoidance, network survivability, and traffic capacity characteristics. The GSN is based on a terrestrial communication network called the bidirectional mesh network (MSN), also called bi-MSN. The bi-MSN is described in pending U.S. Patent application entitled "Bidirectional Mesh Network," by Stamatios V. Kartalopoulos, Attorney Docket No. S. V. Kartalopoulos 6 (1470.0720000), incorporated herein by reference in its entirety. Before proceeding further, it will be illustrative to briefly describe the bi-MSN.

1. Bidirectional Mesh Network (bi-MSN)

The bi-MSN has high channel/bandwidth capacity, high efficiency, fault tolerance, and network survivability. Thus, the bi-MSN is capable of supporting broadband multimedia services (i.e., real-time communication).

Figure 1:
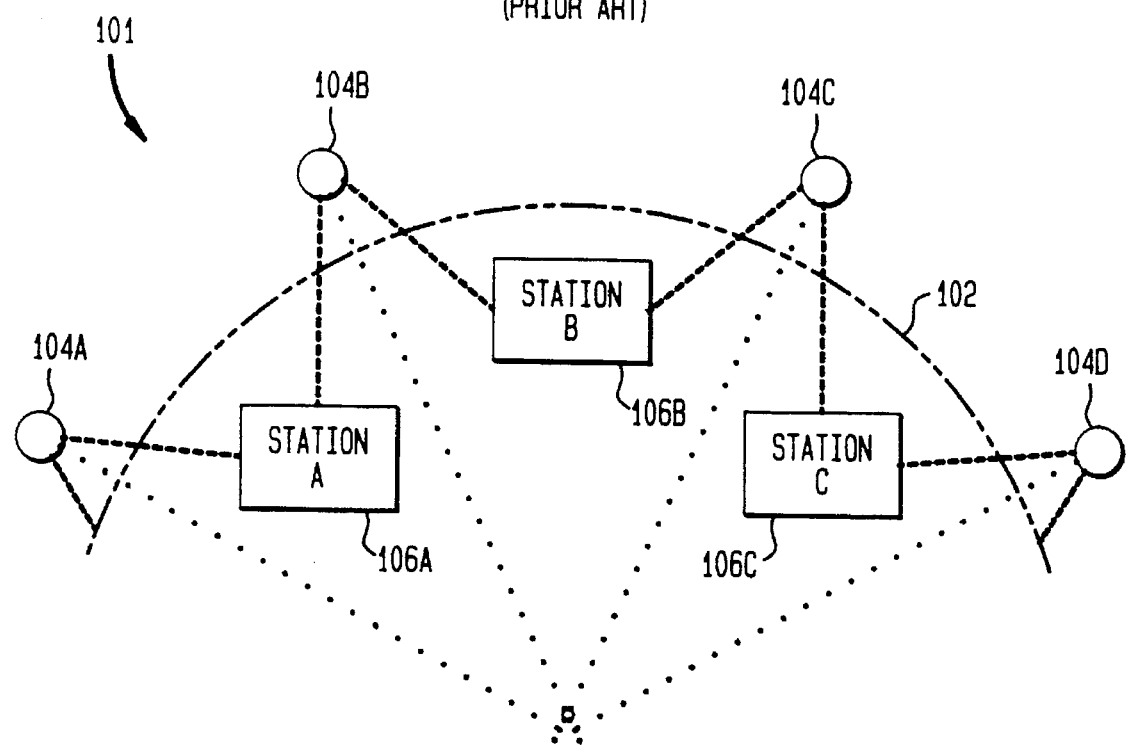
FIG. 1 illustrates a conventional geostationary satellite system.
Figure 2:
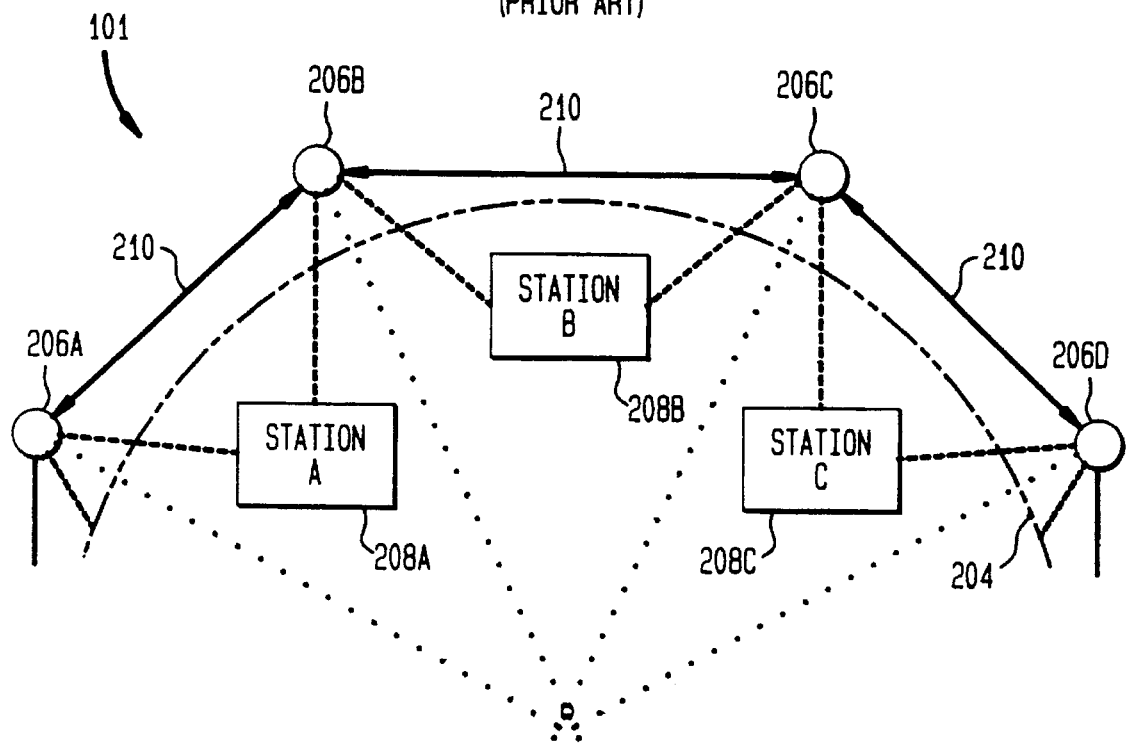
FIG. 2 illustrates a conventional geostationary satellite network with inter-satellite links.
Figure 3:
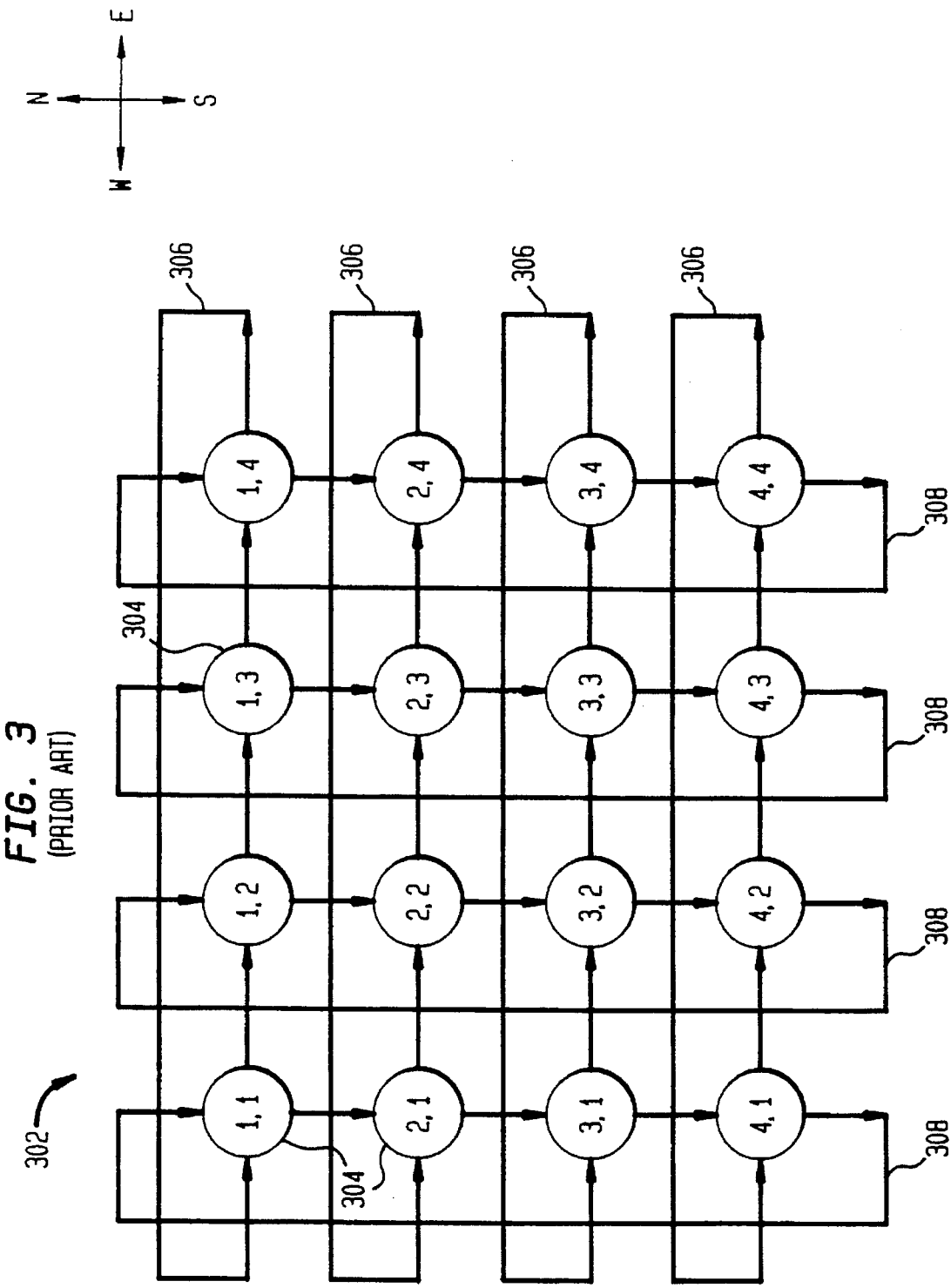
FIG. 3 illustrates a conventional Manhattan Street Network with Loop Architecture.
Figure 4:
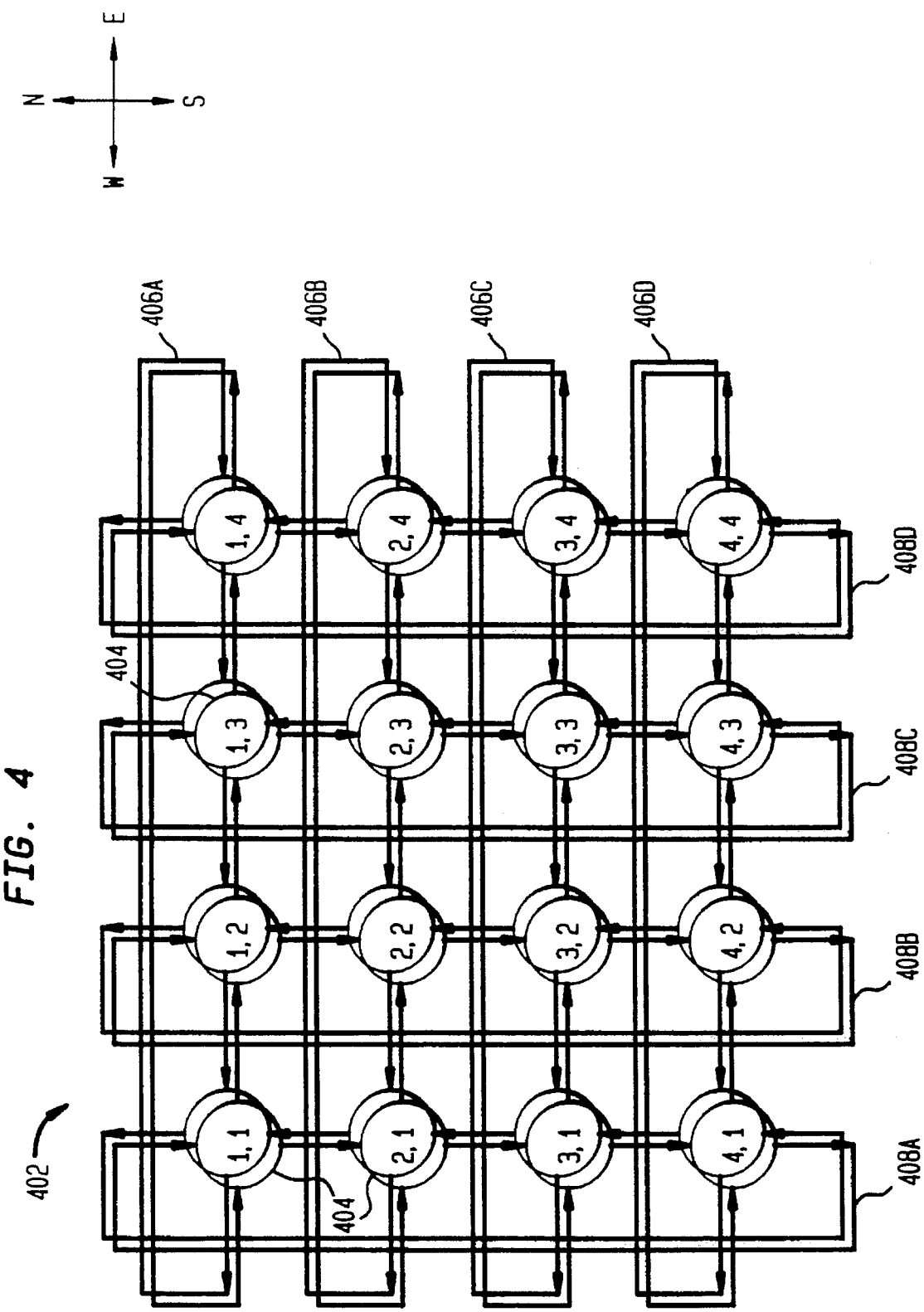
FIG. 4 illustrates a bidirectional mesh network.

FIG. 4 illustrates an example M×N bi-MSN 402. In the example shown in FIG. 4, both M and N are equal to four. However, M and N can be other values, and M does not have to be the same as N.

The bi-MSN 402 has sixteen nodes 404, where each node 404 is individually identified by its (row, column). The nodes 404 in the bi-MSN 402 are remotely programmable and reconfigurable, thus making the bi-MSN 402 an intelligent network.

The bi-MSN 402 is a mesh network that includes a set of horizontal parallel loops 406 and a set of vertical parallel loops 408. The horizontal loops 406 intersect and connect to the vertical loops 408 at the nodes 404. It should be understood that the terms horizontal and vertical are used herein for illustrative purposes, and they denote the preferred embodiment. The loops 406 and 408, which intersect one another, may be offset from one another by an angle other than 90 degrees. Also, the loops 406 need not be precisely parallel to each other. Similarly, the loops 408 need not be precisely parallel to each other.

Each node 404 includes four input ports, called the North input port, the South input port, the East input port, and the West input port. Similarly, each node 404 includes four output ports, called the North output port, the South output port, the East output port, and the West output port. The names of these input and output ports identify the links to which they are connected. Consider, for example, node (2, 1). Its North input and output ports are connected to the link that resides directly to the south of node (1,1) (this link connects node (2,1) to node (1,1)). Similarly, its West input and output ports are connected to the link that resides directly to the east of node (2,4) (this link connects node (2,1) to node (2,4)).

Each node 404 is capable of receiving data packets from any of its input ports and transmitting data packets via any of its output ports. Note that the links which connect the nodes 404 to one another are bidirectional. Thus, each node 404 is capable of transporting data packets from a horizontal loop 406 to a vertical loop 408 in any direction, and vice versa. Consider the example where node (2,3) wishes to transmit a data packet to node (2,2). Since links are bidirectional in the bi-MSN, this data transfer takes place over a single link (i.e., node (2,3) transmits the packet via its West output port, and node (2,2) receives the packet via its East input port)).

The bi-MSN 402 has distributed control. Specifically, each node 404 in the bi-MSN 402 makes autonomous decisions on how a packet should be routed (i.e., the routability of a packet).

The links in the bi-MSN 402 which connect the nodes 404 to one another may be any existing and suitable transmission media, such as fiber, cable, twisted wire, or wireless. The selection of transmission medium is implementation dependent and is determined by many factors, such as transmission techniques (time division multiple access, TDMA, frequency division multiple access, FDMA, code division multiple access, CDMA, etc.), channel capacity, transmission speed, internode distance, etc.

The bi-MSN 402 exhibits superior network survivability characteristics. The bi-MSN 402 can survive single, multiple, or cluster node failures. When one or more clusters of nodes 404 in the bi-MSN 402 fail, the bi-MSN 402 is able to avoid affected areas and establish communication paths between two or more nodes 404 via paths comprising unaffected nodes 404.

2. Overview of the Global Multi-Satellite Network (GSN)

Figure 5:
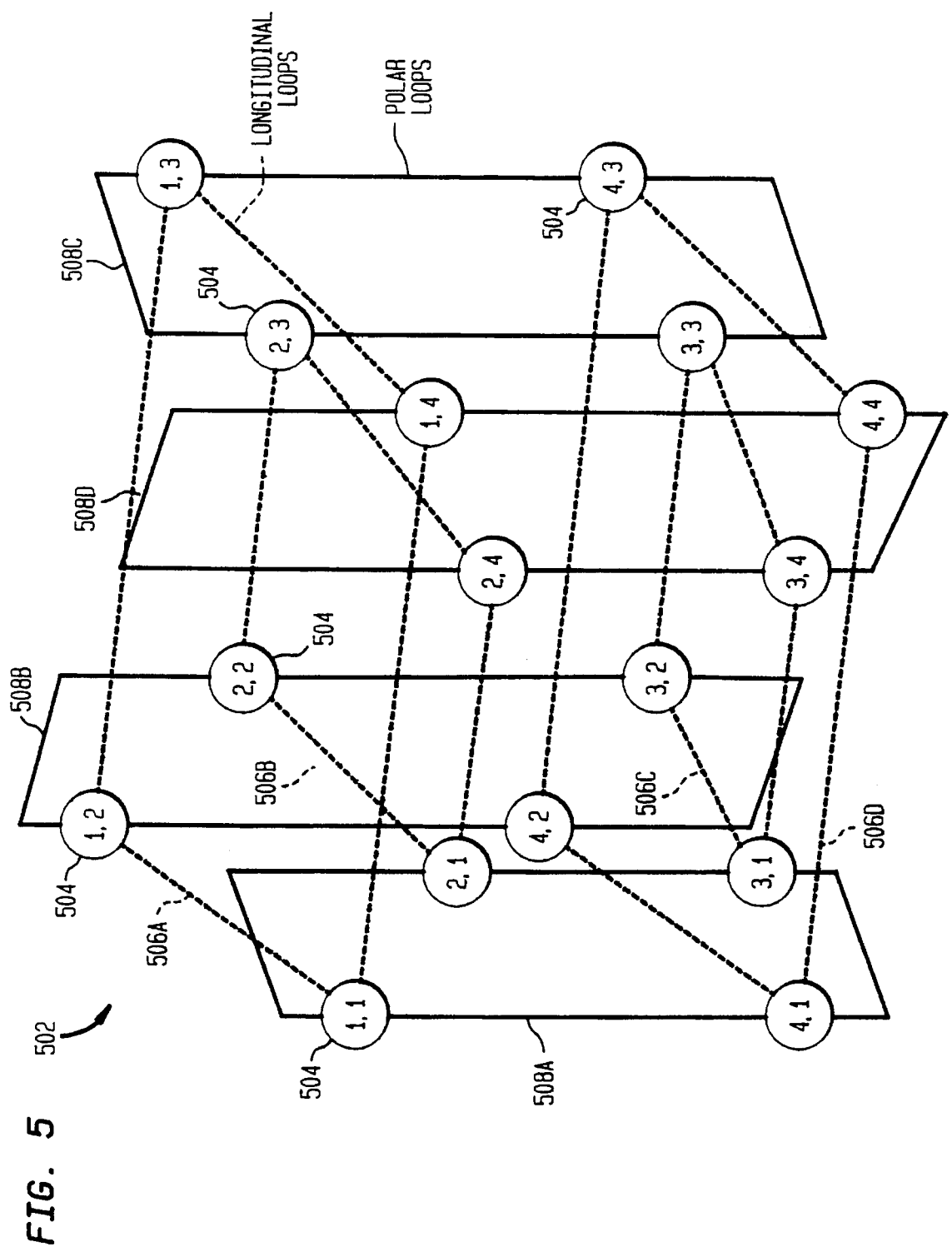
FIGS. 5, 6A, 6B, and 7 illustrate embodiments of a global multi-satellite network according to the present invention.

As noted above, the global multi-satellite network (GSN) of the present invention is based on the bidirectional mesh network (MSN), also called bi-MSN, described above. An example 4×4 GSN 502 is conceptually shown in FIG. 5. The GSN 502 is similar to a bi-MSN that has been mapped into a three dimensional space.

Specifically, the GSN 502 includes a set of horizontal loops 506 (also called longitudinal loops) and a set of vertical loops 508 (also called polar loops). The longitudinal loops 506 are generally parallel to one another, and the polar loops 508 are generally parallel to one another. Note that the longitudinal loops 506 and the polar loops 508 have been projected into three dimensional space. The longitudinal loops 406 intersect and connect to the polar loops 408 at the nodes 404.

Each longitudinal loop 506 intersects each polar loop 508 exactly once. Also, each polar loop 508 intersects each longitudinal loop 506 exactly once. A node is placed at each intersection, where a node is implemented as a satellite. Accordingly, the GSN 502 represents a three dimensional grid of satellites.

Figure 6A:
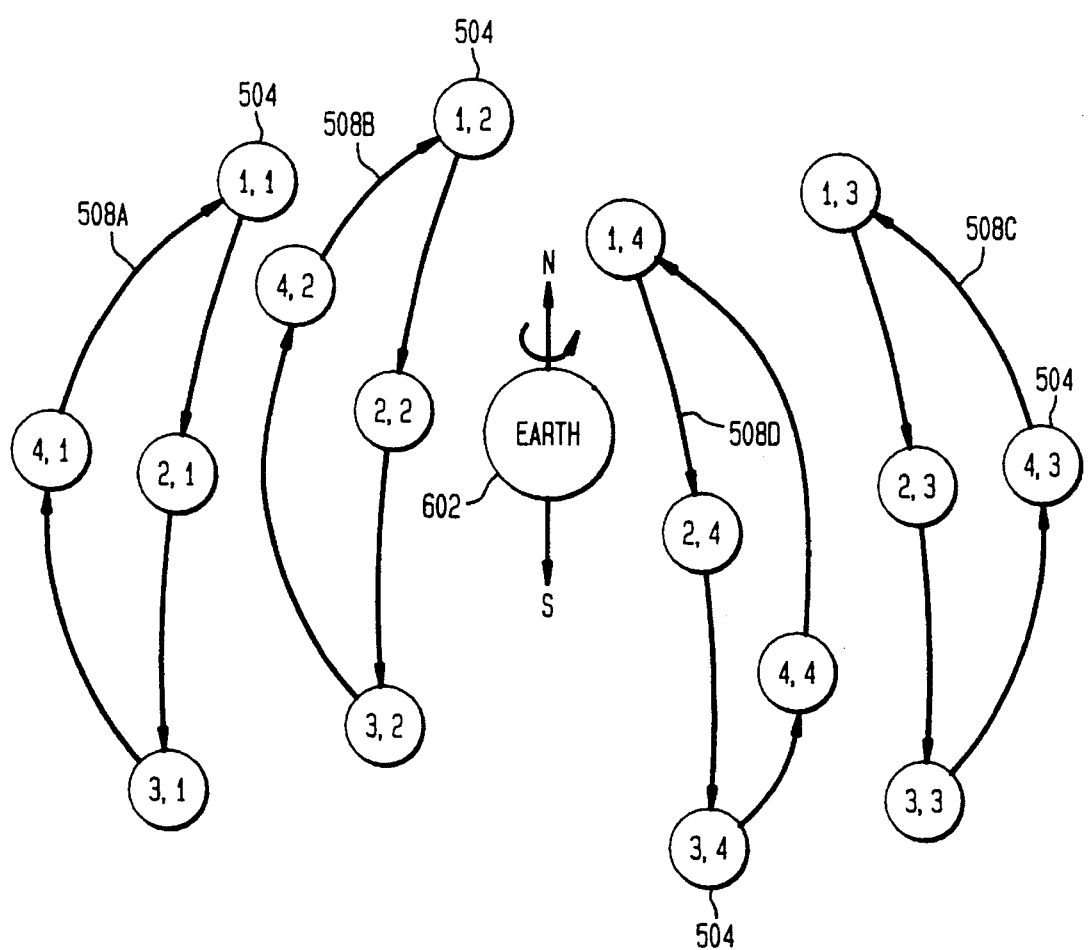
Figure 6B:
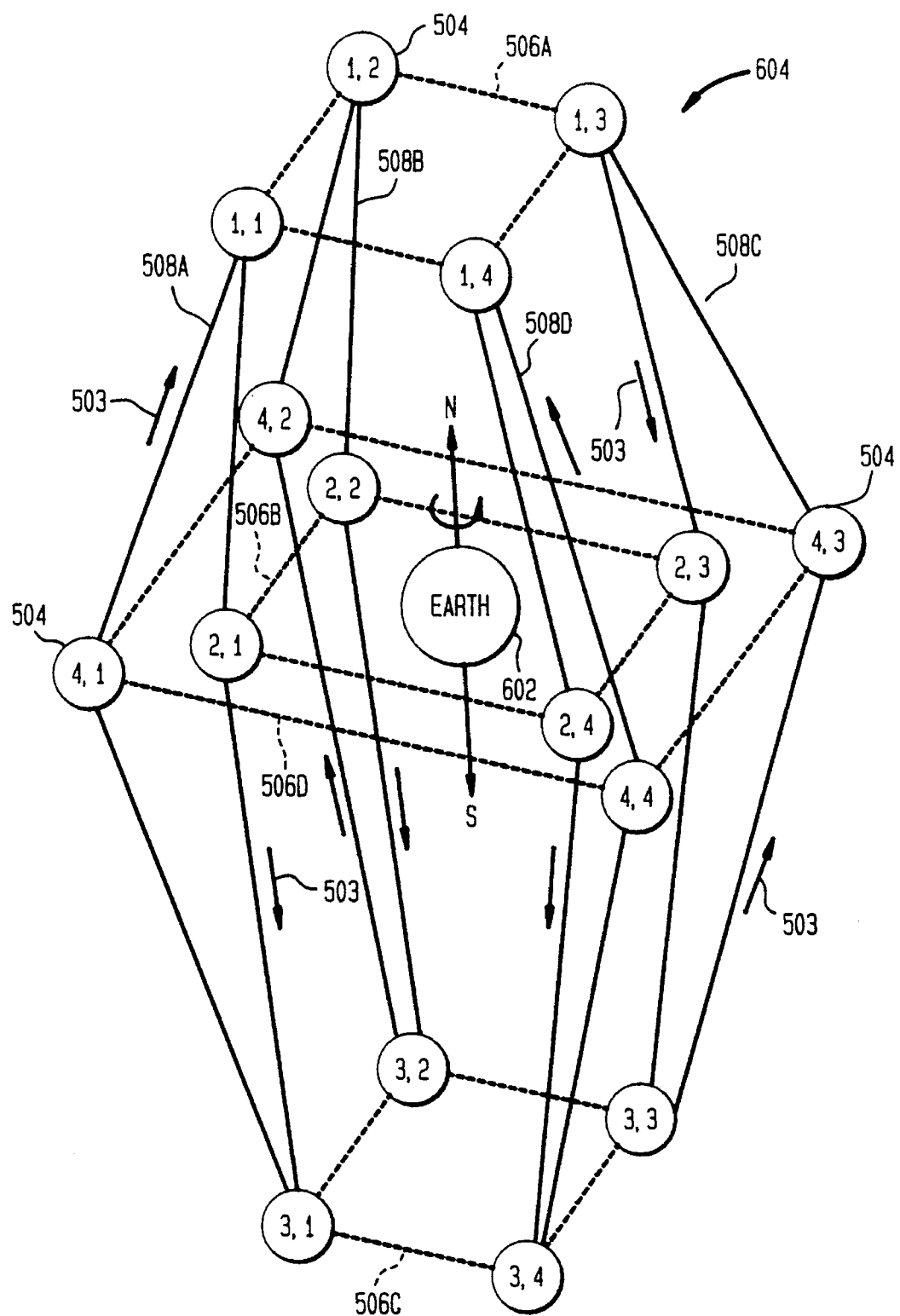

An example 4×4 GSN 604 mapped around a spherical surface is shown in FIG. 6B. According to the present invention, the GSN 604 is centered about the Earth 602. The internode connections (i.e., intersatellite links, or ISLs) are straight paths. Thus, the GSN 604 is a satellite grid network that wraps around the globe 602. More particularly, the GSN 604 is a seamless spherical grid of satellites formed around the globe 602 in East-West and North-South orientations.

According to the present invention, each node 504 (i.e., satellite) includes five input ports, called the North input port, the South input port, the East input port, the West input port, and the uplink input port. Similarly, each node 504 includes five output ports, called the North output port, the South output port, the East output port, the West output port, and the downlink output port.

The nodes 504 communicate with terrestrial stations (also called earth stations) and with their respective four neighboring satellites via these input and output ports. Accordingly, these nodes 504 are also called cross-interconnected GSN nodes. (However, all nodes 504 do not have to communicate with all four neighboring nodes or with terrestrial stations. A node's connectivity depends on particular satellite traffic requirements and satellite positioning.)

Note that a node 504 does not communicate with all nodes which are adjacent to it. Instead, the node 504 communicates with four adjacent nodes (these nodes are called "adjacent communicating nodes" for reference purposes). Two of these adjacent communicating nodes are in the same polar loop 508 as the node 504, and precede and follow it in the polar loop 508. The other two adjacent communicating nodes are in the same longitudinal loop 506 as the node 504, and precede and follow it in the longitudinal loop 506. For example, the four adjacent communication nodes of node (2,2) are node (2,1), node (2,3), node (1,2), and node (3,2).

Each node 504 is capable of receiving data packets from any of its input ports and of routing and re-transmitting these data packets via any of its output ports. Note that the links between the nodes 504 are bidirectional. Thus, each node 504 is capable of transporting data packets from a longitudinal loop 506 to a polar loop 508 in any direction, and vice versa. Consider the example where node (2,3) wishes to transmit a data packet to node (2,2). Since links are bidirectional in the GSN 604, this data transfer takes place over a single link, directly from node (2,3) to node (2,2).

FIG. 6A depicts the orbits of the satellites 504 in the GSN 604 (these orbits are also indicated in FIG. 6B by directional arrows 503). In this embodiment, the orbits correspond to the polar loops 508. Other orbital configurations are also possible, as described in a section below.

According to the present invention, the satellites 504 in each longitudinal loop 506 move in synchronization with each other, so that each longitudinal loop 506 always comprises the same satellites 504. However, each longitudinal loop 506 may be in different positions at different points in time. For example, at time t1 the longitudinal loop 506A may be positioned as shown in FIG. 6B. At time t2, the longitudinal loop 506A may be in the position occupied by longitudinal loop 506B at time t1. At time t3, the longitudinal loop 506A may be in the position occupied by longitudinal loop 506C at time t1. At time t4, the longitudinal loop 506A may be in the position occupied by longitudinal loop 506D at time t1. The present invention employs well known acquisition and tracking systems and procedures to enable neighboring satellites (who are communicating with each other) to automatically acquire and track one another.

Figure 7:
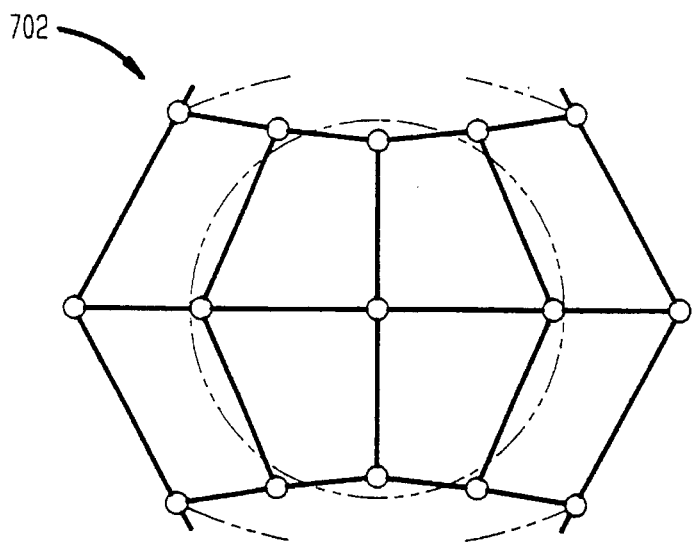

FIG. 7 depicts a GSN 702 according to another embodiment of the present invention (some nodes are not shown). This GSN 702 comprises a set of longitudinal loops intersected by a set of polar half-loops. In this embodiment, the polar regions may or may not have a node. The polar regions are covered by nodes positioned in their vicinity.

3. Features and Characteristics of the Global Multi-Satellite Network (GSN)

Communication features and performance characteristics of the GSN are discussed in the following sections.

3.1 Network Efficiency

In the following sections, packet deliverability, network propagation delay, network congestion, and flow control are discussed.

3.1.1 Packet Deliverability in the GSN

This section considers a data packet's deliverability from the standpoint of different available routes in the GSN of the present invention. For comparison purposes, first consider an N×N Manhattan Network. The total number of possible routes per channel without visiting the same node twice between a source node and a destination node in this Manhattan Network is approximately N!(N−1).

Now consider an N×N GSN. Because of the bidirectional nature of the GSN, the number of possible routes increases more rapidly (when compared to the Manhattan Network) as N increases. For example, for a 2×2 GSN the number of possible routes is eight, for a 3×3 GSN the number of possible routes is estimated to be 176, and for a 4×4 GSN the number of possible routes is estimated to be 1592.

Thus, as the number of nodes in the GSN increases, the deliverability of the GSN increases rapidly in an exponential fashion. Some of these routes may seem convoluted and under normal circumstances they may not be optimal. However, in a large network where some nodes are faulty, these complicated routes may play a significant role in packet deliverability.

3.1.2 End-to-end Propagation Delay

In long haul satellite networks, the end-to-end propagation delay (source to destination) of a data packet is the sum of the delays in the terrestrial network at both ends, including UL/DL (uplink/downlink) satellite delays, and delays due to satellite network and transmission methods (TDMA, FDMA). Typical round trip satellite delays may vary from tens to hundreds of milliseconds, depending on the type of orbit; for example, for a geostationary satellite the roundtrip delay is approximately 270 msecs.

Satellite network delays depend on the number of nodes in the selected route (thus, on the number of inter-satellite links), on the average buffer occupancy or average queue length in the nodes, and also on the number of transfers from one loop to another (e.g., a transfer of a data packet from a longitudinal loop to a polar loop, or vice versa) in the path. Accordingly, when routing packets, the present invention attempts to select routes where packets move only once from a longitudinal loop to/from a polar loop (this assumes that the source and destination nodes are not on the same loop).

It should be pointed out that the dominant delay components are the UL/DL roundtrip delay and queue delays based on the worst case engineering of nodes in the network (channel capacity, number of users, channel bandwidth, number of slots, etc. ) and the transmission method (e.g., FDMA, TDMA).

3.1.3 Network Congestion and Flow Control

Network congestion is considered here in conjunction with UL/DL channel capacity and ISL (inter-satellite link) channel capacity. For this analysis, it is assumed that a TDMA or a CDMA approach is used. The CDMA (i.e., spread-spectrum multiple access) approach has the added advantage of cryptographic and anti-jam characteristics, which are desirable in military as well as civilian applications.

The bits per second (bps) link capacity, C, is calculated by means of the well known Shannon formula $C = W \log(1+S/N)$, where W is the channel bandwidth in Hz, and S/N is the signal-to-noise power ratio at the receiver (in the satellite). From the bps link capacity and the bps per channel value (e.g., 32 Kbps for voice channels), the capacity of channels per inter-satellite link, n, is calculated.

To determine the channel capacity of the ISLs, the following network parameters must be known: the per node UL/DL bps link capacity, C, the channel capacity of the ISL, n, the number of nodes per loop, N, and the percentage of channel blocking allowed. Assuming only one loop (the most basic network) with N nodes, each node with n UL/DL channels, and 0% blocking, then the inter-satellite link channel capacity is $n^*N/2 + I_{Net}$, where $I_{Net}$ is a small number of additional channels needed for inter-network parameter communication.

For two parallel loops A and B with the same number of nodes each, and assuming that 50% of the traffic passes from each node of loop A to nodes of loop B, in addition to traffic on loop B, then the worst case ISL channel capacity in loop B is $3n/2^*N/2 + I_{Net}$. Expressions for different numbers of loops in the satellite network, polar and longitudinal, and for different assumptions, will be apparent to persons skilled in the relevant art based on the above discussion.

The actual number of ISL channels determines the switching fabric capacity of the node and the network traffic congestion conditions. Traffic congestion is unlikely to occur over the entire satellite network, due to geographic time differences in the network, season differences, etc. In general, when some part of the network approaches congestion levels, some other part of the network experiences low traffic levels; excess traffic may then be diverted terrestrially from network congested areas and uplinked at an uncongested part of the satellite network.

3.2 Fault Tolerance

The GSN of the present invention is fault tolerant and exhibits excellent network survivability characteristics with respect to single, multiple, and cluster node failures. Its ability to survive node failures is enhanced by its superior network routability abilities, which are the result of its bidirectional nature. When one or more clusters of nodes in the GSN fail, the GSN is able to avoid affected areas and establish communication between two or more nodes via paths containing unaffected nodes.

For example, consider the GSN 604 shown in FIG. 6. Under fault conditions, where one or more links are down and/or one or more nodes 504 are inoperable, an alternate route which bypasses the "trouble" area is selected. Assume, for example, that node (2,3) is faulty. For any given source node and destination node, a number of routes that do not involve node (2,3) are available, such that connectivity between nodes is not adversely affected by the faulty node (2,3). Suppose that a node fails after a path (called the original path) has been established. In this case, an alternate path is chosen by a node (in the original path) that is physically closer to the failed node (this is described in greater detail below). Hence, the GSN, in addition to fault avoidance, exhibits network self-healing characteristics.

3.3 Disaster Avoidance

The GSN of the present invention exhibits excellent disaster avoidance properties. Consider the case where one or more clusters of nodes become inoperable. In this case, the GSN bypasses the affected areas and establishes communication using the remaining healthy network (assuming that sufficient connectivity still exists).

4. Structure and Operation of the Global Multi-Satellite Network (GSN)

The global multi-satellite network (GSN) of the present invention shall now be discussed in greater detail. During this discussion, reference shall be made to the GSN 604 shown in FIG. 6B.

4.1 Communication Links

Two types of links are discussed in this section: the uplink (UL) and downlink (DL) links between the satellite nodes 504 and the earth stations, and the links between the satellite nodes 504 (these are called inter-satellite links, ISLs).

The UL/DL links are preferably implemented using the frequencies, access methods, and protocols conforming to frequencies allocated for satellite communication systems, and standard satellite access techniques (e.g., TDMA, FDMA, CDMA). This may include earth coverage (EC) beams and/or steerable or fixed spot beams. Such satellite systems and techniques are well known and are discussed in many publicly available documents, such as Tri T. Ha, Digital Satellite Communications, MacMillan Publishing Co., New York, 1986.

The inter-satellite links are preferably implemented using lasers. The use of laser signals to communicate signals between satellites is well known and is discussed in many publicly available documents, such as W. English, "Study on Intersatellite Laser Communication Links", Final Report, ESTEC Contract No. 3555, 1979; V. Chan et at., "Heterodyne laserCOM Systems Using GaAs Lasers for ISL Applications", ICC '83, Jun. 19–22, Boston, Mass, 1983; W. R. Leeb, "Prospects for laser communications in space", Proc. European Space Agency (ESA) Workshop on Space Laser Applications and Technology, Les Diablerets, Mar. 26–30, 1984 (ESA SP-202, May 1984); and J. E. Kaufmann and V. W. S. Chan, "Optical Heterodyne Intersatellite Links Using Semiconductor lasers", GlobeCom '84, Nov. 26–29, Atlanta, GA, 1984. Lasers have been reported to transmit up to 72,000 Km.

Alternatively, the ISLs are implemented using microwave beams.

According to the present invention, well known acquisition and tracking systems and procedures are used to enable neighboring satellites (who are communicating with each other) to automatically acquire and track one another. Acquisition and tracking systems and procedures are well known and are described in many publicly available documents, such as Morgan et al., Communications Satellite Handbook, John Wiley and Sons, 1989, incorporated herein by reference. As discussed herein, the satellite nodes 504 are on known orbits and are moving in the same direction. Thus, this cooperative tracking process is much simpler to implement and achieve as compared to tracking processes between, for example, an aircraft and a moving target. This is the case, since (a) the target is not cooperating with the aircraft, and (b) the target and the aircraft are moving in three dimensional space in unknown trajectories.

4.2 Satellite Nodes

Figure 8:
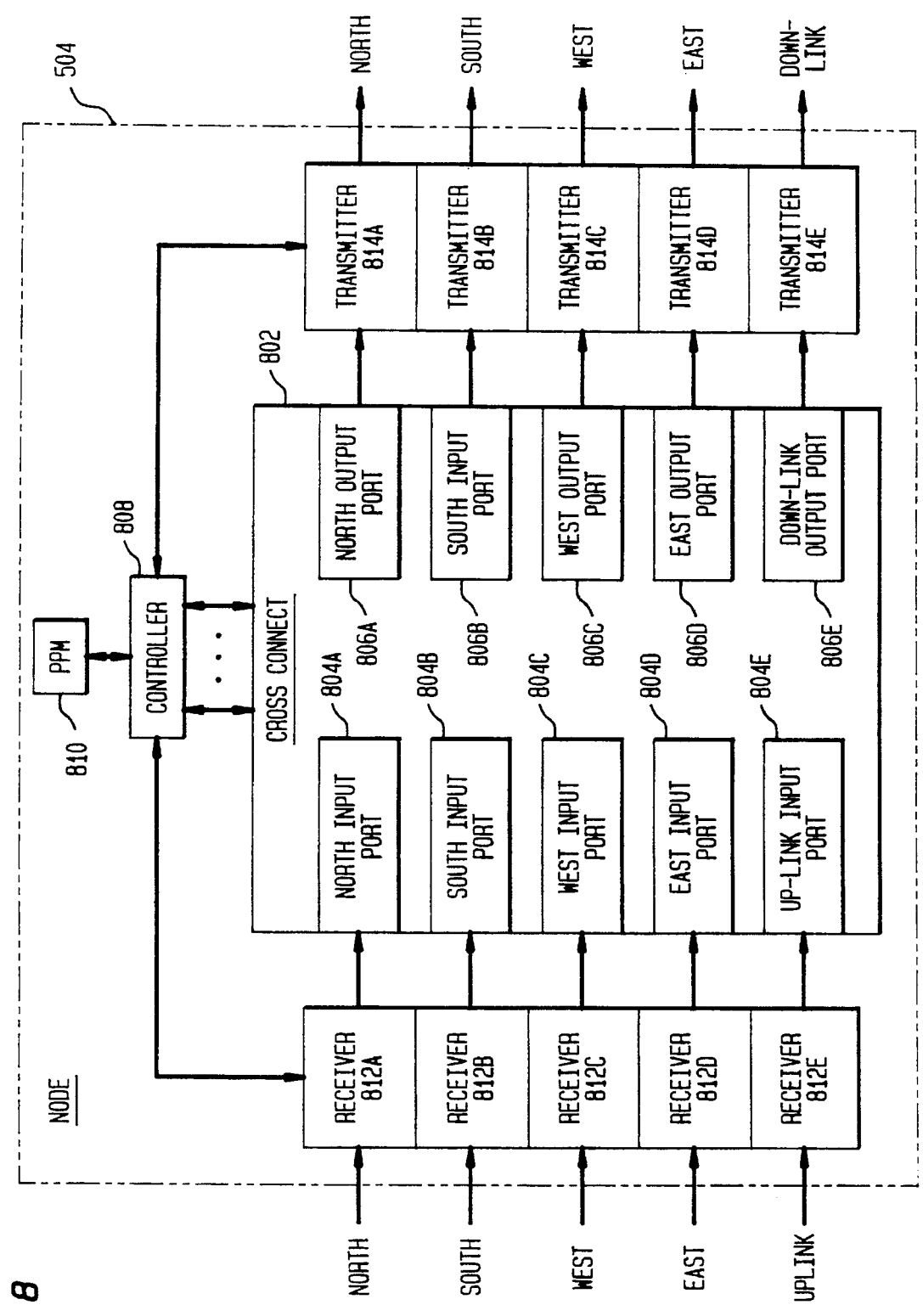
FIG. 8 is a block diagram of a satellite node that forms part of the global multi-satellite network.

FIG. 8 is a block diagram of a satellite node 504. The node 504 includes five receivers 812 for receiving signals from the four neighboring nodes (which are in communication with this node 504) and the earth station. The node 504 also includes five transmitters 814 for sending signals to the four neighboring nodes and the earth station. The receivers 812 and transmitters 814 can be implemented using any well known and appropriate communication receivers and transmitters.

Each node 504 includes a cross connect 802 (connected to the receivers 812 and transmitters 814) that represents a $5n$ input by $5n$ output space-time communication switch (n indicates the number of channels per input/output).

The cross connect 802 includes a North input port 804A, a South input port 804B, a West input port 804C, an East input port 804D, and an uplink input port 804E. The North input port 804A, South input port 804B, West input port 804C, and East input port 804D receive signals from the node's four neighboring satellite nodes. The uplink input port 804E receives signals from the earth station with which the node 504 is in communication.

The cross connect 802 also has a North output port 806A, a South output port 806B, a West output port 806C, an East output port 806D, and a downlink output port 806E. The North output port 806A, South output port 806B, West output port 806C, and East output port 806D send signals to the node's four neighboring satellite nodes. The downlink output port 806E sends signals to the earth station with which the node 504 is in communication.

The cross connect 802 is capable of connecting any of the input ports 804 to any of the output ports 806. For example, the cross connect 802 can connect the West input port 804C to the West output port 806C. Thus, the present invention provides a loop-back network capability for node and network path testing purposes.

The cross connect 802 is controlled by a controller 808, which preferably represents a central processing unit (CPU)

operating according to computer software. Alternatively, the controller 808 can be implemented in hardware, using hardware state machines, for example. The controller 808 controls all functions of the node 504. These functions are described below. In performing these functions, the controller 808 may refer to data stored in a performance parameter map (PPM) 810, which is preferably a table stored in memory, such as random access memory (RAM).

Figure 9:
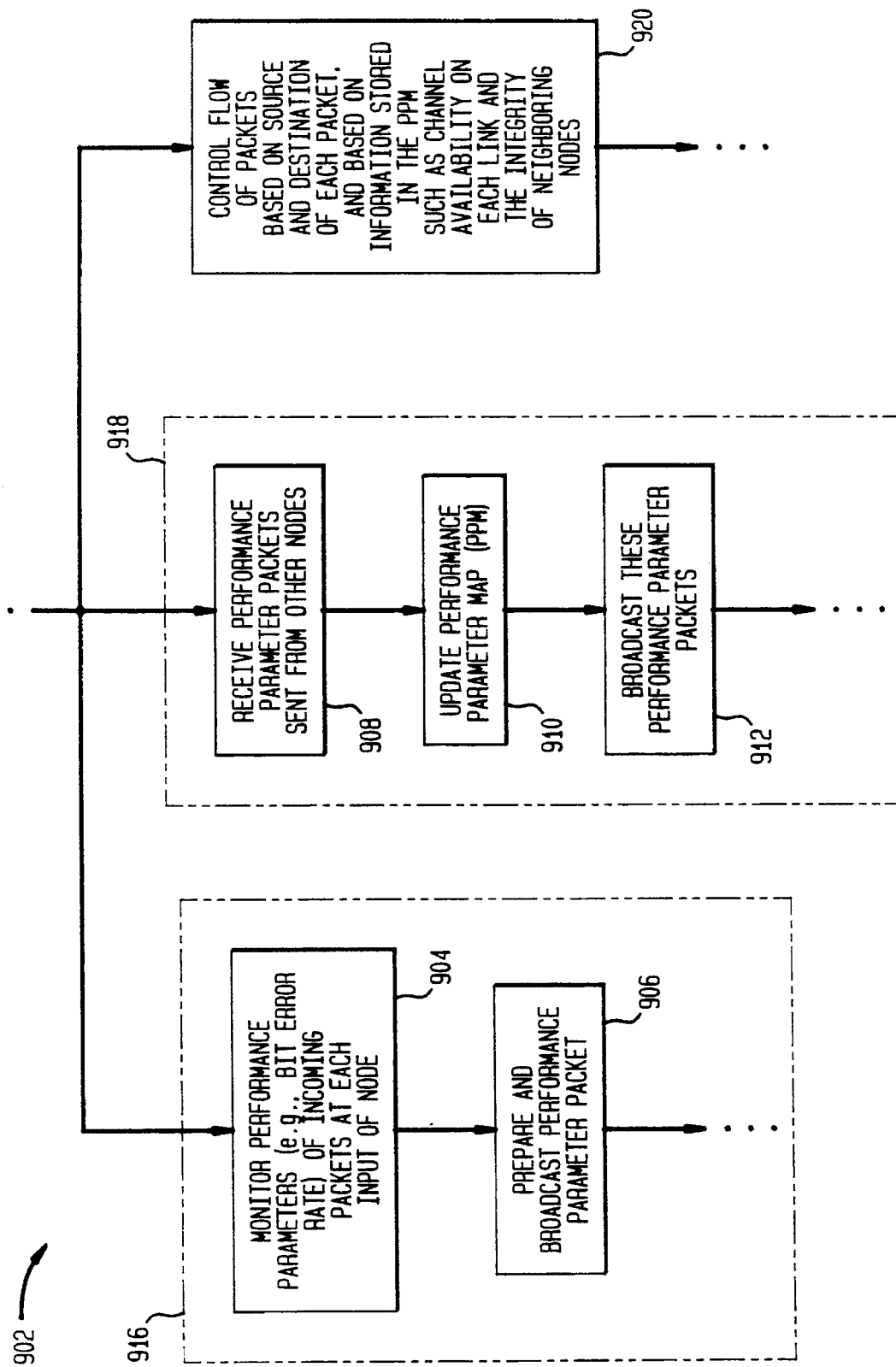
FIG. 9 is a functional diagram of the node of FIG. 8.

The functions performance by the node 504 as dictated by the controller 808 shall now be described with reference to a functional block diagram 902 shown in FIG. 9. The node 904 performs three primary functions: self diagnostics 916, PPM updating 918, and packet routing 920. These functions 916, 918, and 920 may be performed in parallel with one another (as indicated in FIG. 9), but may also be performed serially, or independently with respect to each other.

The self diagnostics function 916 is periodically performed. As indicated by step 904, the self diagnostics function 916 involves monitoring the performance parameters of the input nodes 804 as packets arrive at the input nodes 804. Monitoring performance parameters is a well known operation. Such performance parameters include packet error rate, congestion parameters, link and node integrity, delay parameters, etc. These performance parameters represent a measure of the communication integrity of each input node 804 (and the communication circuitry associated with each input node 804, such as the receivers 812). As indicated in step 906, the node 504 prepares a packet containing these performance parameters and also the identifier (such as the address) of the node 504. The manner in which this packet is prepared will be apparent to persons skilled in the relevant art. The node 504 then broadcasts (i.e., sends via all of its output ports) this performance parameter packet to the other nodes.

The PPM updating function 918 is performed whenever the node 504 receives a performance parameter packet from another node. This is represented by step 908, where the node 504 receives a performance parameter packet from another node.

In step 910, the node 504 uses the information contained in the performance parameter packet to update its performance parameter map 810. The performance parameter map 810 contains an entry for each node in the GSN 604. These entries contain performance parameter information for their respective nodes. Thus, during step 910, the node 504 uses the information contained in the performance parameter packet to update the entry in the PPM 810 corresponding to the node which originated (i.e., "sourced") the performance parameter packet.

By reference to the PPM 810, it is possible to identify working and non-working nodes, nodes which have input port problems, nodes which have output port problems (this can be determined by referencing performance parameter information associated with nodes that are downstream from the node in question), etc. The use of the PPM 810 is discussed further below.

In step 912, the node 504 broadcasts the received performance parameter packet to the other nodes in the GSN 604. In this manner, performance parameter packets are eventually received by all nodes in the GSN 604.

The packet routing function 920 (also called the flow control function) is performed whenever the node 504 receives a data packet, or when the node 504 wishes to source a new data packet. While performing the packet routing function 920, the node 504 determines how to best route the received data packet based on the source and destination nodes of the packet, and the information contained in the PPM 810.

Figure 10:
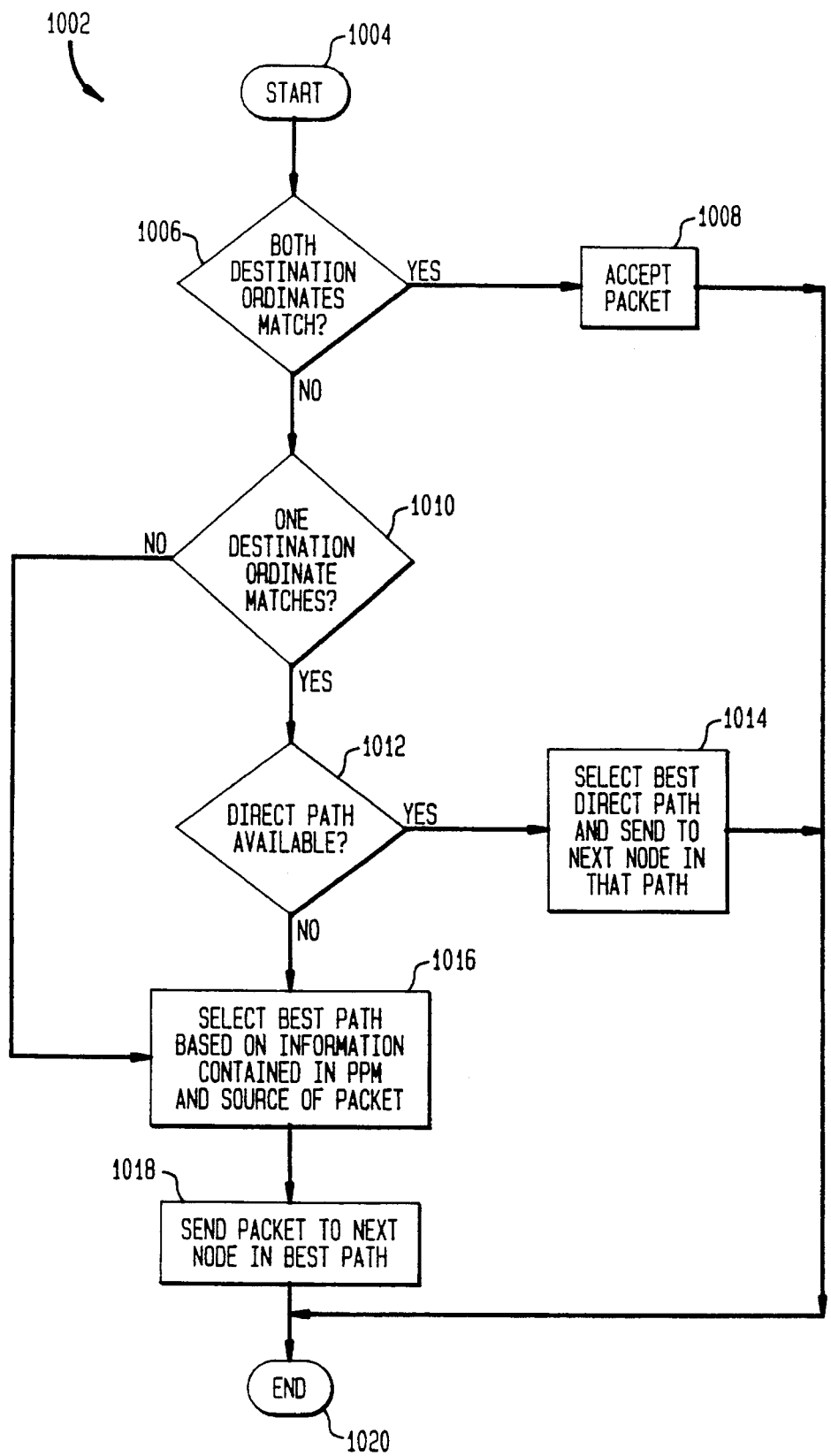
FIGS. 10 and 11 are flowcharts indicating the manner in which each node routes packets through the network.

The manner in which the node 504 performs the packet routing function 920 shall now be explained in greater detail with reference to a flowchart 1002 shown in FIG. 10. Flowchart 1002 begins with step 1004, where control immediately passes to step 1006.

In step 1006, the node 504 determines whether both ordinates of the packet's destination address match the two ordinates of its own address (in other words, the node 504 determines whether it is the destination of the packet). The packet's destination address is contained in the packet itself. Thus, in this step, the node 504 reads the packet for the destination address, which is expressed as (row,column), where row and column are ordinates of the destination address. The node 504 compares the destination address to its own address, and determines whether the row and column ordinates of the destination address match the row and column ordinates of its own address. If these ordinates match, then the node 504 concludes that it is the destination of the packet. Consequently, the node 504 accepts the packet, and downlinks the accepted packet to its associated earth station (step 1008; flowchart 1002 is complete after processing step 1008, as indicated by step 1020). Otherwise, the node 504 performs step 1010.

In step 1010, the node 504 determines whether one of the ordinates of the packet's destination address matches one of the ordinates of its own address. If a match is found, then step 1012 is performed. Otherwise, step 1016 is performed. For example, assume that node (2,3) is processing step 1010 for a packet having a destination address of (4,3). In this case, the column ordinates match, so the node (2,3) would perform step 1012. Assume, instead, that the packet's destination address was (4,4). In this case, there is no match, so step 1016 would be performed (described below).

In step 1012, the node 504 determines whether a direct path to the destination node is available. Since one of the ordinates of the packet's destination address matches one of the ordinates of the node 504's address, two direct paths are guaranteed to exist; however, one or both of these direct paths may not be available due to a failure in an intervening node. The node 504 identifies failures in nodes by referring to the performance parameter information contained in its PPM 810.

For example, assume that node (1,3) is processing step 1012 for a packet having a destination address of (4,3). Two direct paths exist from node (1,3) to node (4,3). The first path goes from node (1,3), to node (2,3), to node (3,3), to node (4,3). The second path goes from node (1,3) to node (4,3). One or both of these paths may not be available due to a failure in an intervening node. Assume that node (3,3) has failed. In this case, the first path is not available.

If, in step 1012, the node 504 determines that a direct path to the destination node is available, then step 1014 is performed. In step 1014, the node 504 selects one of these direct paths and then sends the packet to the next node in the selected direct path. If only one direct path is available, then the node 504 selects that path. However, if both direct paths are available, then the node 504 selects the best path, where the best path is defined as the path which results in the shortest propagation delay from the original node (the source node) to the destination node. In this instance, the best path is the one having the least amount of nodes. In the above example where node (1,3) is processing step 1012 for a packet having a destination address of (4,3), the best path is the one from node (1,3) to node (4,3).

Flowchart 1002 is complete after processing step 1014, as indicated by step 1020.

If, in step 1012, the node 504 determines that a direct path to the destination node is not available, then step 1016 is performed. In step 1016, the node 504 identifies and selects the best available path to the destination node. It is assumed in this discussion that there is at least one available path to the destination node.

If there is not a path available, then the action taken by the node 504 depends on the service type of the packet. If the packet is involved in a real time service (such as real time voice), then preferably the packet is dropped and the connection is dropped (the node 504 may send a message reporting this to the source node). If, instead, the packet is involved in a non-real time service (such as store and transfer data transmission), then the node 504 saves the packet in its queue and sends the packet later once a path becomes available (although if no path becomes available after a given amount of time, then the packet is dropped).

Figure 11:
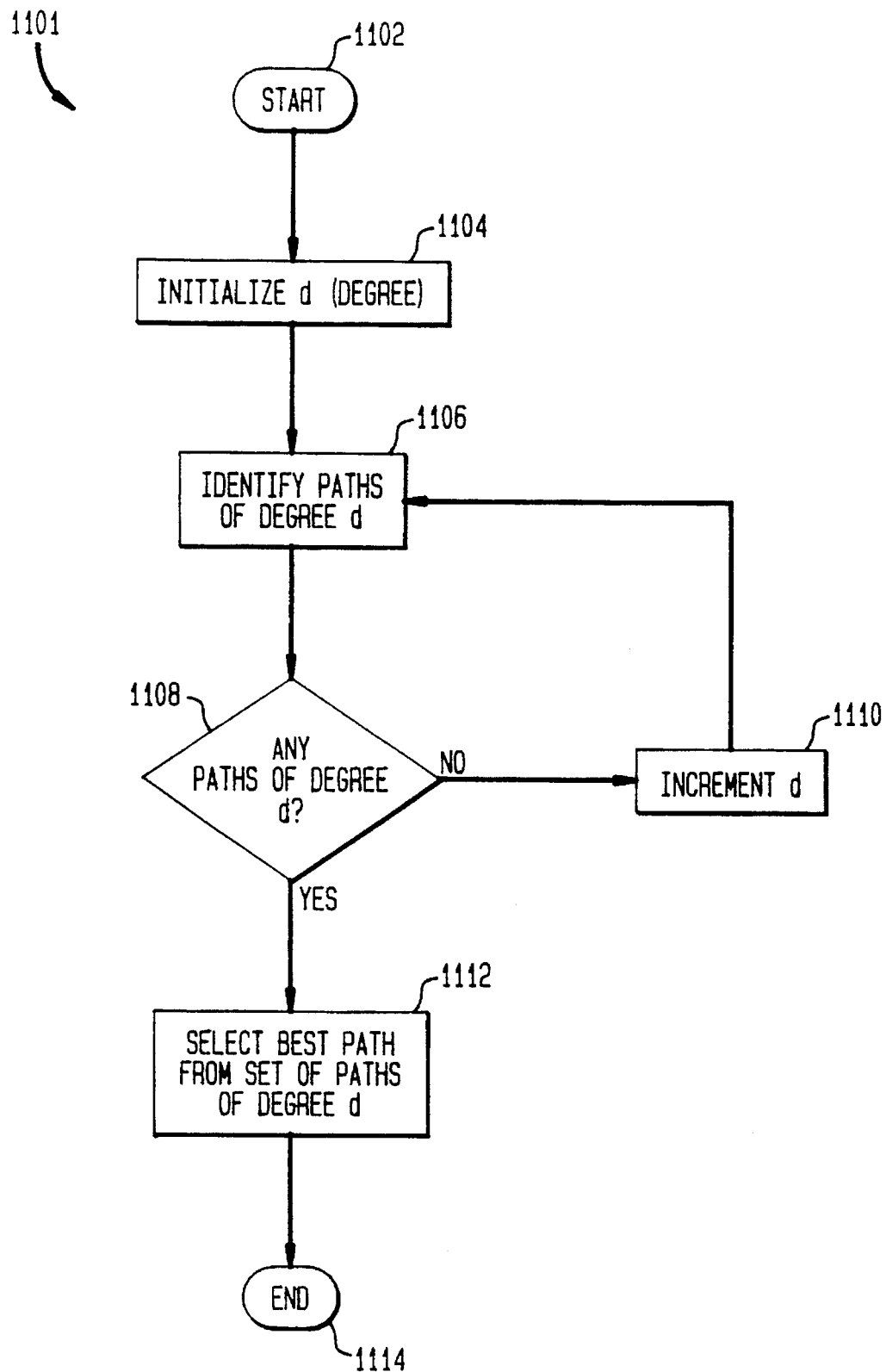

The manner in which the node 504 performs step 1016 shall now be described in detail with reference to a flowchart 1101 in FIG. 11. Flowchart 1101 begins with step 1102, where control immediately passes to step 1104.

In step 1104, the node 504 initializes a degree variable, d, to zero.

In step 1106, the node 504 identifies all available paths of degree d to the destination node. A path is of degree 0 if it involves 0 inter-loop transfers. An inter-loop transfer is a transfer of a packet from a longitudinal loop 506 to a polar loop 508, or vice versa. For example, suppose node (1,1) originates a packet having a destination of node (1,3). There are two paths of degree 0, the first from node (1,1) to node (1,2) to node (1,3), and the second from node (1,1) to node (1,4) to node (1,3).

A path is of degree 1 if it involves 1 inter-loop transfer. For example, suppose node (1,1) originates a packet having a destination of node (4,4). There are a number of paths of degree 1, the first from node (1,1) to node (4,1) to node (4,4), the second from node (1,1) to node (1,4) to node (4,4), and the third from node (1,1) to node (2,1) to node (3,1) to node (4,1) to node (4,2) to node (4,3) to node (4,4). There are additional paths of degree 1, as will be apparent to persons skilled in the relevant art.

The nature of paths of degrees higher than 1 will be apparent to persons skilled in the relevant art based on the above discussion.

Some processing time is involved with performing inter-loop transfers. Thus, to reduce propagation delays, it is desirable to select a path having the smallest number of inter-loop transfers possible. In other words, the present invention operates to select the lowest degree path possible to transfer the packet to the destination node (that is why d is initialized to zero in step 1104).

Note that, in step 1106, the node 504 identifies all available paths of degree d to the destination node. Thus, paths of degree d may exist, but they may not be available due to failures in nodes and/or links.

Also note that, in step 1106, the node 504 considers the loop on which the packet was received when identifying the paths of degree d. For example, suppose that node (1,2) receives a packet from node (1,1) on loop 506A, and that this packet has a destination of node (4,4). With respect to node (1,2), paths of degree 1 include a path from node (1,2) to node (1,4) to node (4,4). The path from node (1,2) to node (4,2) to node (4,4) also appears, at first glance, to be a path of degree 1. However, this is in actuality a path of degree 2, since it involves two inter-loop transfers, one from longitudinal loop 506A to polar loop 508B at node (1,2), and a second from polar loop 508B to longitudinal loop 506D at node (4,2).

As indicated by decision step 1108, if no paths of degree d are available, then step 1110 is performed. In step 1110, d is incremented by one, and then control returns to step 1106.

If, instead, one or more paths of degree d are determined to be available, then step 1112 is performed. In step 1112, the node 504 selects one of these available paths of degree d. If only one degree d path is available, then the node 504 selects that path. However, if more than one degree d paths are available, then the node 504 selects the best path, where the best path is defined as the path which results in the shortest propagation delay from the original node (the source node) to the destination node. In this instance, the best path is the one having the least amount of nodes.

Flowchart 1101 is complete after processing step 1112, as indicated by step 1114.

Referring again to FIG. 10, in step 1018 the node 504 sends the packet to the next node (i.e, the adjacent node) in the path selected in step 1016. Operation of flowchart 1002 is complete after step 1018, as indicated by step 1020.

5. Growth of the Global Multi-Satellite Network (GSN)

A communication network's ability to grow and expand is particularly important in satellite networks, since it may be necessary to construct the network over time due to the relatively high costs involved in constructing and deploying satellites. The GSN of the present invention is advantageous because it has very flexible growth characteristics.

Figure 12:
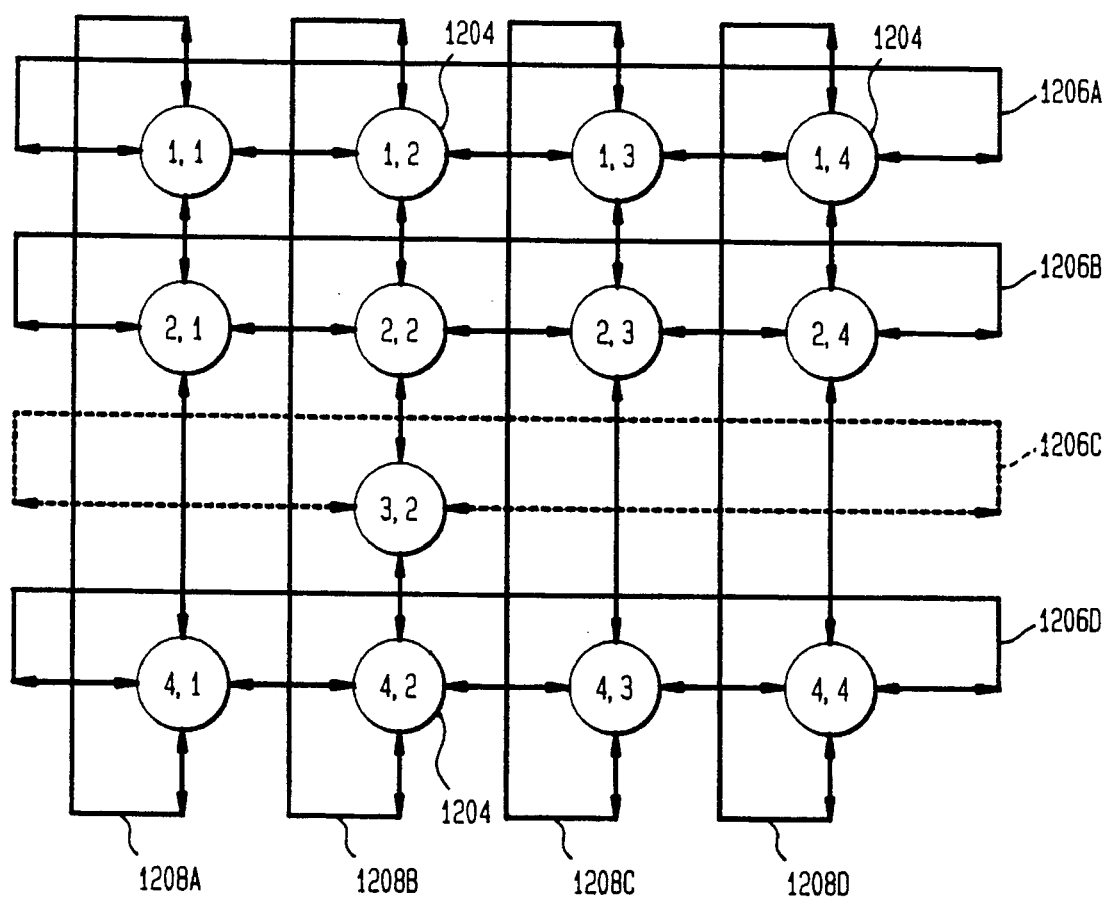
FIG. 12 illustrates the manner in which the global multi-satellite network may be expanded.

Adding a node in the GSN is relatively simple: a node is inserted into an existing loop between two other nodes. An example GSN 1202 is shown in FIG. 12. For simplicity purposes, the GSN 1202 is shown in FIG. 12 in a two dimensional bi-MSN topology. The mapping of this two dimensional topology to the three dimensional GSN topology will be apparent to persons skilled in the relevant art based on the discussion above.

In this GSN 1202, a new node (3,2) has been added in polar loop 1208B. No other satellite nodes exist in the corresponding new longitudinal loop 1206C (although other satellite nodes may be added at a later time). Thus, new node (3,2)'s two West-East transceivers are disabled. If a new node is added to an existing longitudinal loop, then that new node's North-South transceivers are disabled. The disabled transceivers are enabled at a latter time when adjacent nodes are added.

6. Satellite Orbital Options of the Global Multi-Satellite Network (GSN)

There are many orbital options for the satellite nodes in the GSN of the present invention. Two orbital options are presented below, one with nodes in geosynchronous inclined circular orbits, and another with nodes in inclined elliptical orbits.

6.1 Geosynchronous Inclined Orbits

Figure 13:
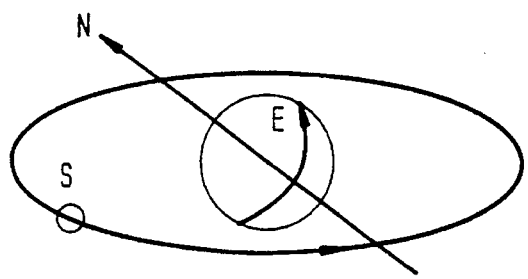
FIGS. 13 and 14 illustrate different orbital options of the satellite nodes in the global multi-satellite network.

Assume that a satellite node S moves in an inclined geosynchronous circular orbit about the earth E, as shown in FIG. 13 (the "N" in FIG. 13 stands for north). Then, the satellite S is viewed from an earth station as moving on a meridian North-South and South-North. A GSN as shown in FIG. 7 can be constructed by placing more satellites in similar orbits at meridians separated by 360° /n (such as 90°), and also by placing multiple satellites in the same orbit.

6.2 Inclined Elliptical Orbits

Figure 14:
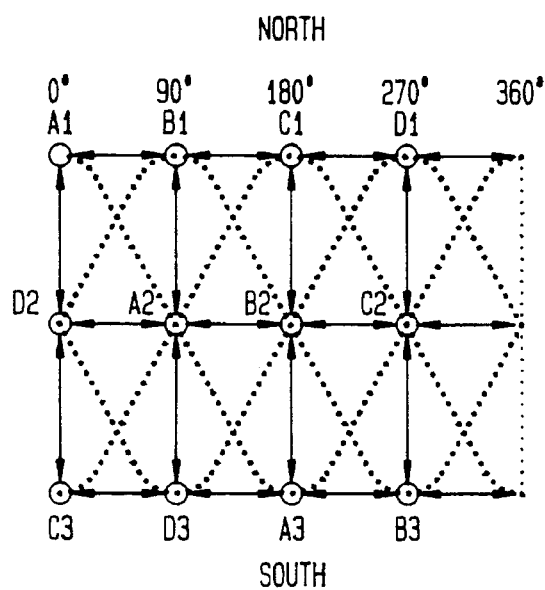

In this case, satellites are in inclined orbits (e.g., Molniya) that are not geosynchronous. Then, a satellite is viewed from the earth as moving around it and in a sinusoidal-like motion around the equator. Again, a GSN as shown in FIG. 7 can be constructed by placing satellites in similar orbits separated by 360°/n (such as 90°), and by placing more than one satellite in the same orbit. However, as will be appreciated, the kinematics and complexity of this network are different than the one described in the previous section. FIG. 14 illustrates this case with four elliptical orbits each 90° apart and with four satellites in each orbit (four satellites are not shown for clarity).

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A global satellite communication network, comprising:
   a polar communication loop comprising a plurality of nodes each bidirectionally communicating with adjacent nodes in said polar communication loop; and
   a longitudinal communication loop comprising a plurality of nodes each bidirectionally communicating with adjacent nodes in said longitudinal communication loop, said longitudinal communication loop in communication with said polar communication loop via a node which is common to both said polar and longitudinal communication loops;
   said polar and longitudinal communication loops formed in three dimensional space;
   said common node comprising a switch to transfer packets received from said polar communication loop to said longitudinal communication loop, and vice versa, as a function of destination addresses contained in said packets,
   wherein each of said nodes comprises,
      a plurality of input ports for receiving signals from an associated earth station and from communicating adjacent nodes;
      means for monitoring performance parameters of said input ports;
      means for generating a performance parameter packet containing an identifier of said each node and said performance parameters; and
      means for broadcasting said performance parameter packet to all other nodes in said global satellite communication network.

2. The global satellite communication network of claim 1, wherein said polar communication loop is aligned substantially perpendicular to said longitudinal communication loop.

3. A global satellite communication network, comprising:
   a polar communication loop comprising a plurality of nodes each bidirectionally communicating with adjacent nodes in said polar communication loop; and
   a longitudinal communication loop comprising a plurality of nodes each bidirectionally communicating with adjacent nodes in said longitudinal communication loop, said longitudinal communication loop in communication with said polar communication loop via a node which is common to both said polar and longitudinal communication loops;
   said polar and longitudinal communication lops formed in three dimensional space; and
   said common node comprising a switch to transfer packets received from said polar communication loop to said longitudinal communication loop, and vice versa, as a function of destination addresses contained in said packets,
   wherein each of said nodes comprises,
      means for receiving a performance parameter packet from another node in said global satellite communication network, said performance parameter packet comprising performance parameters pertaining to said another node, said performance parameters indicating a communication integrity of said another node; and
      means for updating an entry in a performance parameter map corresponding to said another node in accordance with said performance parameters contained in said performance parameter packet.

4. The global satellite communication network of claim 3, wherein said each node also comprises:
   means for receiving a data packet;
   means for selecting a path in said global satellite communication network on which to route said data packet to its destination in accordance with performance parameter information contained in said performance parameter map; and
   means for sending said data packet to a next adjacent communicating node in said selected path.

5. A global satellite communication network, comprising:
   a plurality of polar communication loops each comprising a plurality of nodes each bidirectionally communicating with adjacent communicating nodes in said polar communication loops;
   a plurality of longitudinal communication loops each comprising a plurality of nodes each bidirectionally communicating with adjacent communicating nodes in said longitudinal communication loops;
   said polar and longitudinal communication loops formed in three dimensional space; and
   each longitudinal communication loop in communication with each polar communication loop via a node which is common to both said each longitudinal communication loop and said each polar communication loop;
   said common node comprising a switch to transfer packets received from said each polar communication loop to said each longitudinal communication loop, and vice versa, as a function of destination addresses contained in said packets, wherein each of said nodes comprises,
   a plurality of input ports for receiving signals from an associated earth station and from communicating adjacent nodes;
   means for monitoring performance parameters of said input ports;
   means for generating a performance parameter packet containing an identifier of said each node and said performance parameters; and
   means for broadcasting said performance parameter packet to all other nodes in said global satellite communication network.

6. The global satellite communication network of claim 5, wherein said polar communication loops are aligned substantially parallel to one another, and said longitudinal communication loops are aligned substantially parallel to one another.

7. The global satellite communication network of claim 5, wherein said polar communication loops are aligned substantially perpendicular to said longitudinal communication loops.

8. A global satellite communication network, comprising:

a plurality of polar communication loops each comprising a plurality of nodes each bidirectionally communicating with adjacent communicating nodes in said polar communication loops;

a plurality of longitudinal communication loops each comprising a plurality of nodes each bidirectionally communicating with adjacent communicating nodes in said longitudinal communication loops;

said polar and longitudinal communication loops formed in three dimensional space; and each longitudinal communication loop in communication with each polar communication loop via a node which is common to both said each longitudinal communication loop and said each polar communication loop;

said common node comprising a switch to transfer packets received from said each polar communication loop to said each longitudinal communication loop, and vice versa, as a function of destination addresses contained in said packets, wherein each of said nodes comprises, means for receiving a performance parameter packet from another node in said global satellite communication network, said performance parameter packet comprising performance parameters pertaining to said another node, said performance parameters indicating a communication integrity of said another node; and means for updating an entry in a performance parameter map corresponding to said another node in accordance with said performance parameters contained in said performance parameter packet.

9. The global satellite communication network of claim 8 wherein said each node also comprises:

means for receiving a data packet;

path selecting means for selecting a path in said global satellite communication network on which to route said data packet to its destination in accordance with performance parameter information contained in said performance parameter map; and means for sending said data packet to a next node in said selected path.

10. The global satellite communication network of claim 9, wherein said path selecting means comprises:

means for determining whether a destination address of said packet matches an address of said each node;

means for accepting said packet if said packet destination address matches said address of said each node;

means for determining, if said packet was not accepted, whether one ordinate of said packet destination address matches a corresponding ordinate of said address of said each node;

means for determining whether a direct path is available from said each node to a destination node of said packet in accordance with performance parameter information contained in said performance parameter map if one ordinate of said packet destination address matches a corresponding ordinate of said address of said each node;

direct path selecting means for selecting an available direct path if one is available; and means for sending said packet to a next node in said selected direct path.

11. The global satellite communication network of claim 10, wherein said path selecting means further comprises:

means for selecting a non-direct path from said each node to said destination node in accordance with performance parameter information contained in said performance parameter map if a direct path is not available; and means for sending said packet to a next node in said selected non-direct path.

12. In a global satellite communication network comprising a plurality of polar communication loops each comprising a plurality of nodes each bidirectionally communicating with adjacent communicating nodes in said polar communication loops, and a plurality of longitudinal communication loops each comprising a plurality of nodes each bidirectionally communicating with adjacent communicating nodes in said longitudinal communication loops, said polar and longitudinal communication loops formed in three dimensional space, each longitudinal communication loop in communication with each polar communication loop via a node which is common to both said each longitudinal communication loop and said each polar communication loop, said common node comprising a switch to transfer packets received from said each polar communication loop to said each longitudinal communication loop, and vice versa, as a function of destination addresses contained in said packets, a method in said common node for routing a packet in said global satellite communication network, comprising the steps of:

(1) determining whether a destination address of said packet matches an address of said common node;

(2) accepting said packet in said common node if said packet destination address matches said common node address;

(3) determining, if said packet was not accepted, whether one ordinate of said packet destination address matches a corresponding ordinate of said common node address;

(4) determining whether a direct path is available from said common node to a destination node of said packet in accordance with performance parameter information contained in a performance parameter map if one ordinate of said packet destination address matches a corresponding ordinate of said common node address;

(5) selecting an available direct path if one is available; and (6) sending said packet to a next node in said selected direct path.

13. The method of claim 12, wherein step (5) comprises the step of:

selecting a direct path containing the least amount of nodes if multiple direct paths are available.

14. The method of claim 12, further comprising the steps of:

(7) means for selecting a non-direct path from said common node to said destination node in accordance with performance parameter information contained in said performance parameter map if a direct path is not available; and (8) sending said packet to a next node in said selected non-direct path.

15. The method of claim 14, wherein step (7) comprises the steps of:

(a) identifying all paths of degree d from said common node to said destination node;

(b) determining whether any of said identified paths of degree d are available in accordance with performance parameter information contained in said performance parameter map; and (c) if one or more of said paths of degree d are available, then selecting one of said available paths of degree d.

16. The method of claim 15, wherein step (c) comprises the step of:

selecting an available path of degree d containing the least amount of nodes if multiple paths of degree d are available.

17. The method of claim 15, wherein step (7) further comprises the step of:

(d) if no paths of degree d are available, then incrementing d by one and repeating steps (a)–(c).

* * * * *